United States Patent
Hongo et al.

(10) Patent No.: US 8,917,612 B2
(45) Date of Patent: Dec. 23, 2014

(54) TRANSMITTING DEVICE AND INFORMATION ACQUISITION CONTROL METHOD

(75) Inventors: Jumpei Hongo, Kawasaki (JP); Syuichi Musou, Kawasaki (JP); Masaki Deguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 13/362,300

(22) Filed: Jan. 31, 2012

(65) Prior Publication Data

US 2012/0237208 A1    Sep. 20, 2012

(30) Foreign Application Priority Data

Mar. 18, 2011   (JP) ................. 2011-061757

(51) Int. Cl.
*G06F 11/07* (2006.01)
*H04Q 11/00* (2006.01)
*H04L 12/46* (2006.01)

(52) U.S. Cl.
CPC ....... *H04Q 11/00* (2013.01); *H04Q 2213/1301* (2013.01); *H04L 12/46* (2013.01)
USPC ........................................ 370/242; 370/252

(58) Field of Classification Search
USPC ........................ 370/242–245, 252
See application file for complete search history.

(56) References Cited

U.S. PATENT DOCUMENTS 6,567,386 B1    5/2003   Sugaya et al.
2010/0241784 A1*  9/2010  Iyer et al. ................. 711/5

FOREIGN PATENT DOCUMENTS

JP           11-252092        9/1999

* cited by examiner

*Primary Examiner* — Hoon J Chung
(74) *Attorney, Agent, or Firm* — Staas & Halsey LLP

(57) ABSTRACT

An apparatus includes a first counter circuit that counts a value of first statistical information divided in the time-direction from a first period; a second counter circuit that counts a value of second statistical information divided in the time-direction from a second period following the first period; a control circuit that divides by a specific time period unit and acquires the value of the first statistical information and the value of the second statistical information, and causes a first memory to store the value of the first statistical information, and causes a second memory to store the value of the second statistical information; and a switching circuit that switches the value of the statistical information acquired by the control circuit from the value of the first statistical information to the value of the second statistical information upon a start of the second period.

14 Claims, 12 Drawing Sheets

TRANSMITTING DEVICE AND INFORMATION ACQUISITION CONTROL METHOD

CROSS-REFERENCE TO RELATED APPLICATION(S)

This application is based upon and claims the benefit of priority of the prior Japanese Patent Application No. 2011-61757, filed on Mar. 18, 2011 the entire contents of which are incorporated herein by reference.

FIELD

The embodiment discussed herein relates to a transmitting device and an information acquisition control method.

BACKGROUND

Due to the growth of traffic loads on networks, an administrator conventionally acquires detailed information about traffic on networks by profiling user or application traffic. One type of information is statistical information. Statistical information is accumulated information (count values) of counter numbers such as the number of packets, the number of octets, or the number of errors and the like on a network. Statistical information is used, for example, for diagnosing problems related to network performance, or as periodically acquired and accumulated historical information to be used for operation and maintenance.

Generally, an optical transmitting device manages statistical information related to alarms for each communication path. The optical transmitting device manages the statistical information by storing the statistical information in hardware (HW) counters for each communication path and a central processing unit (CPU) periodically reads out the stored statistical information. The abovementioned communication paths are packet paths established for conducting the transmission and reception of data between arbitrary nodes on a network. Conventional optical transmitting devices are expected to monitor up to 8192 communication paths per device and sound an alarm when any type of abnormality is detected as a result of reading the statistical information.

For example, if there are 4500 communication paths, hardware constituted by an optical transmitting device collects statistical information from 1 to 4500 communication paths and continuously counts the value of the statistical information using the HW counters. The CPU conducts polling to read out the statistical information at certain polling intervals, and adds the value of the statistical information to a random access memory (RAM). The HW counter includes a read clear register to clear the value of the statistical information to "0" when the CPU reads out the value of the statistical information. The CPU reports value of the statistical information that exceeds a threshold in a period (for example, 15 minutes) called a bind period (roll over) as an optical transmitting device alarm. In this way, the optical transmitting device manages the devices to acquire value of the statistical information by enabling a collaboration between the HW counter that continuously collects statistical information and the CPU operating at a certain timing.

For example, Japanese Laid-open Patent Publication No. 11-252092 is disclosed as related art.

SUMMARY

According to an aspect of the invention, an apparatus includes a first counter circuit that counts a value of first statistical information divided in the time-direction from a first period; a second counter circuit that counts a value of second statistical information divided in the time-direction from a second period following the first period; a first memory that stores the value of the first statistical information; a second memory that stores the value of the second statistical information; a control circuit that divides by a specific time period unit and acquires the value of the first statistical information and the value of the second statistical information, and causes the first memory to store the value of the first statistical information, and causes the second memory to store the value of the second statistical information; and a switching circuit that switches the value of the statistical information acquired by the control circuit from the value of the first statistical information to the value of the second statistical information upon a start of the second period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

The following is an explanation of an embodiment of a transmitting device and an information acquisition control method (polling control method) disclosed in the present application with reference to the accompanying drawings. In the present embodiment, polling is not limited to the description herein and refers to processing in which a CPU acquires information from an HW counter and causes the information to be stored in a RAM. The transmitting device and information acquisition control method disclosed herein are not limited to the following embodiment.

Figure 1:
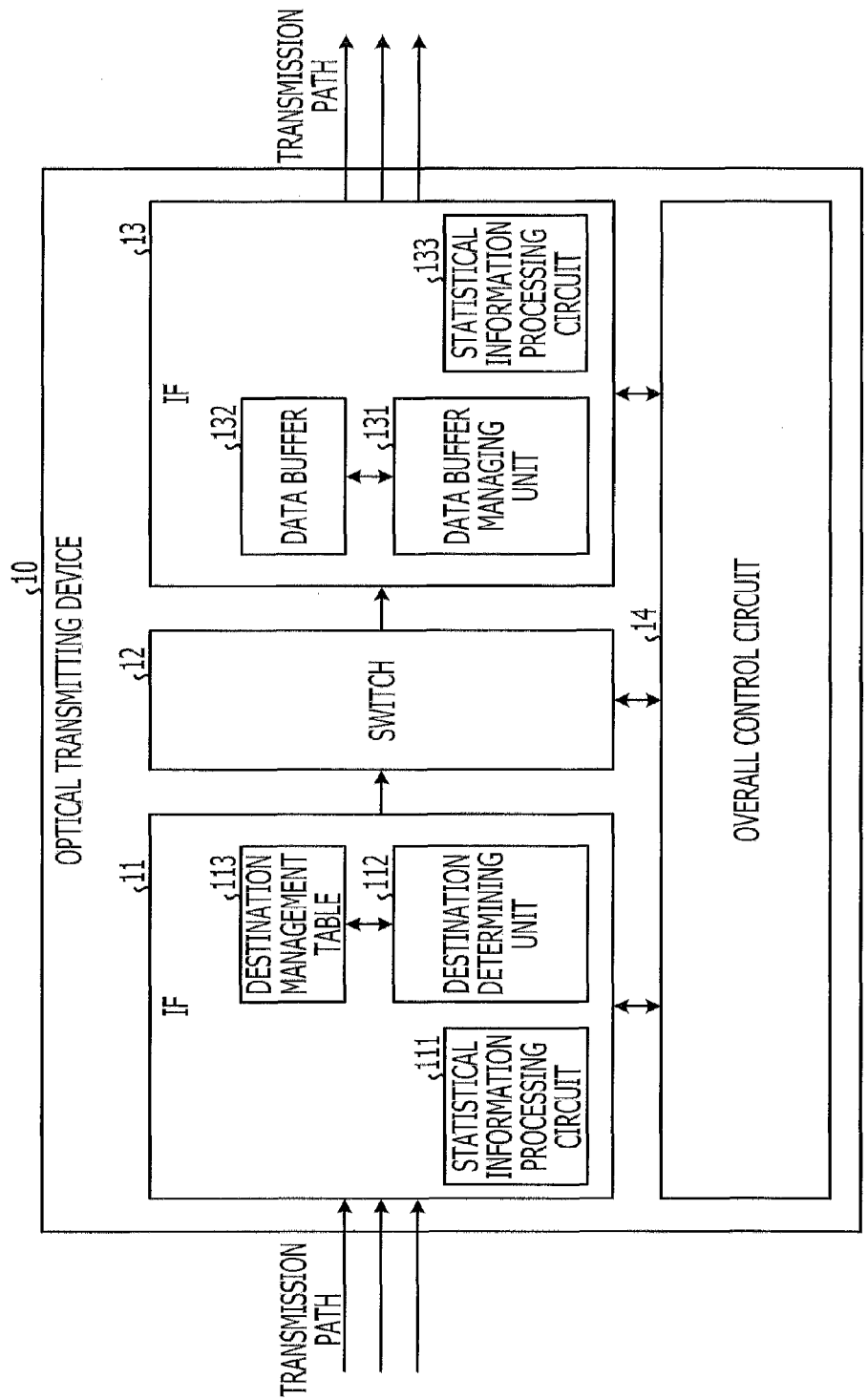
FIG. 1 is an example of an optical transmitting device configuration.

A configuration of an optical transmitting device according to an embodiment disclosed herein will be described first. FIG. 1 is an example of an optical transmitting device configuration. As illustrated in FIG. 1, an optical transmitting device 10 includes an interface (IF) 11, a switch 12, an IF 13, and an overall control circuit 14. The components are coupled to allow for one-way or two-way inputting and outputting of signals and data. The IF 11, the switch 12, the IF 13 and the overall control circuit (processor) 14 may be physically implemented, for example, by a network (NW) card, a switch card, a NW card, and a CPU respectively.

The IF 11 analyzes received data inputted from a transmission path to collect and tally statistical information related to the amount and size of the data. The IF 11 includes a statistical information processing circuit 111, a destination determining unit 112, and a destination management table 113. The components are coupled to allow for one-way or two-way inputting and outputting of signals and data. The statistical information processing circuit 111 is physically implemented by a CPU and manages the abovementioned statistical information. Details of the statistical information processing circuit 111 will be explained below. The destination determining unit 112 is desirably physically implemented by a field-programmable gate array (FPGA), and determines a destination of the received data based on identification information attached to the received data and data in the destination management table 113. The identification information may be, for example, destination information or service type information. The destination management table 113 is physically implemented by a memory such as, for example, a RAM and the like, and is a table that manages a destination address, a transmission source address, a virtual local area network (VLAN) ID, and the like.

The switch 12 switches an output target of the received data according to a determination result made by the destination determining unit 112. Specifically, the switch 12 adds destination information to the received data to generate transmission data which is outputted to a data buffer managing unit 131.

The IF 13 transmits the transmission data to a destination target according to the attached destination information. The IF 13 includes the data buffer managing unit 131, a data buffer 132, and a statistical information processing circuit 133. The components are coupled to allow for one-way or two-way inputting and outputting of signals and data. The data buffer managing unit 131 is desirably physically implemented by a FPGA. The data buffer managing unit 131 stores transmission data inputted from the switch 12 in the data buffer 132 and also reads out the transmission data stored in the data buffer 132 at a certain timing. The data buffer 132 is physically implemented by a memory such as, for example, a RAM, and temporarily stores the transmission data in conjunction with a timing to transmit the transmission data. The statistical information processing circuit 133 is physically implemented by a processor such as, for example, a CPU and manages the abovementioned statistical information. Details of the statistical information processing circuit 133 will be explained below.

The overall control circuit 14 is used and physically implemented by a processor such as, for example, a CPU and monitors the IF 11, the switch 12, and the IF 13.

Figure 2:
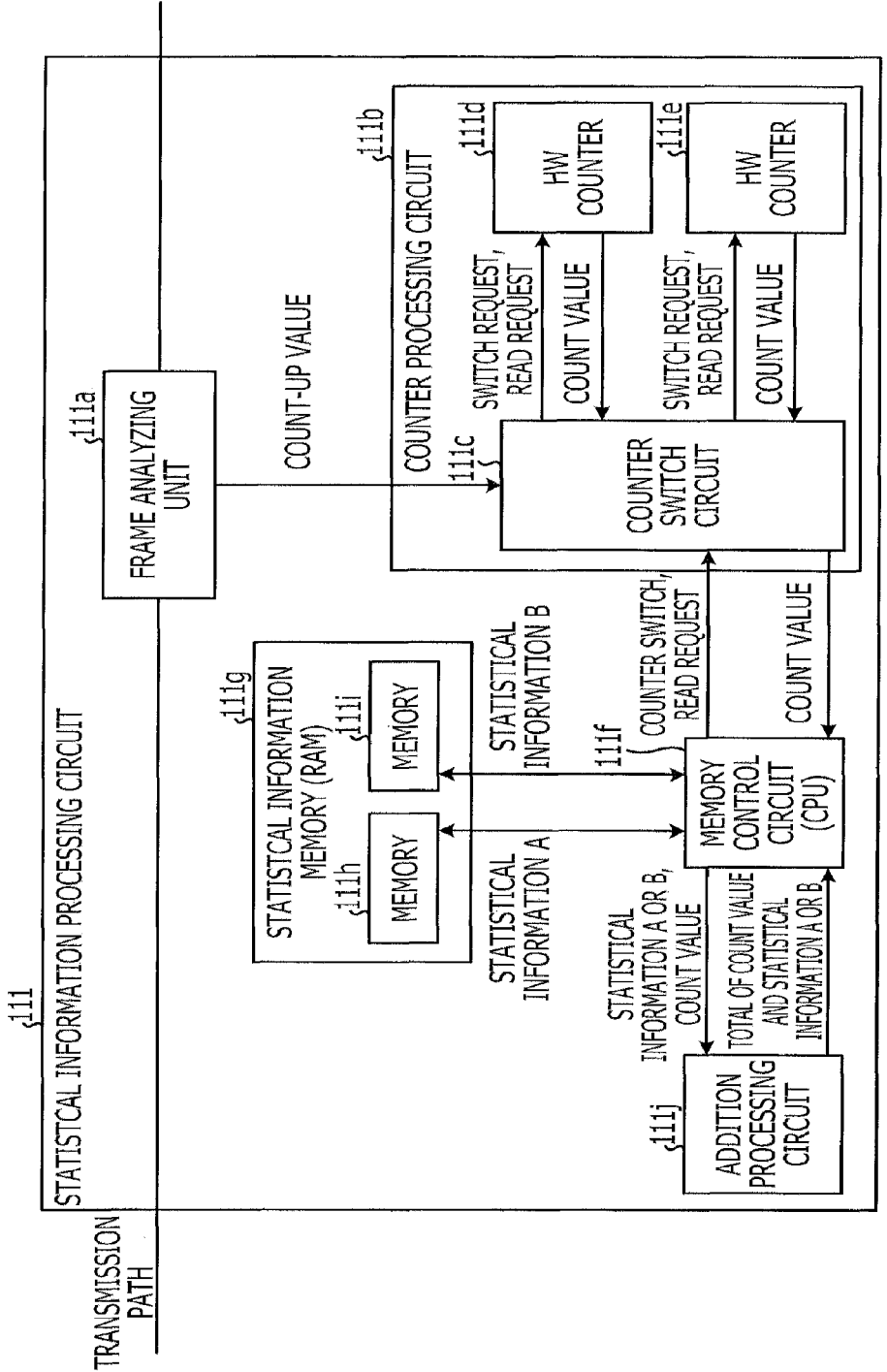
FIG. 2 is an example of a statistical information processing circuit structure.

The following is a description of the abovementioned statistical information processing circuits 111 and 133. The explanation below describes a structure of the statistical information processing circuit 111 as a representative example. The statistical information processing circuit 133 has a similar structure. FIG. 2 is an example of a structure of the statistical information processing circuit 111. As illustrated in FIG. 2, the statistical information processing circuit 111 includes a frame analyzing unit 111a, a counter processing circuit 111b, a memory control circuit 111f, a statistical information memory 111g, and an addition processing circuit 111j. The components are coupled to allow for one-way or two-way inputting and outputting of signals and data. The frame analyzing unit 111a, the counter processing circuit 111b, the memory control circuit 111f, the statistical information memory 111g, and the addition processing circuit 111j are desirably physically implemented by a FPGA, a FPGA, a CPU, a RAM, and a FPGA, respectively.

The frame analyzing unit 111a analyzes data inputted from a transmission line. The frame analyzing unit 111a acquires count-up values that represent statistical information, and entry identification information belonging to the frames by analyzing the received data of the frames, and outputs the acquired information and count-up values to the counter processing circuit 111b. Each count-up value is "1" when the statistical information processing circuit 111 operates as a frame counter. A count-up value may be a byte length of the received data when the statistical information processing circuit 111 operates as a byte counter.

The counter processing circuit 111b includes a counter switch circuit 111c, a HW counter 111d, and a HW counter 111e. The counter switch circuit 111c, the HW counter 111d, and the HW counter 111e are each physically implemented by a FPGA. The counter switch circuit 111c outputs a switch request to the HW counter to be used among the two HW counters 111d and 111e to select the HW counter 111d or 111e to be used. The switch between the HW counters 111d and 111e is triggered at a bind period (roll over) timing when an interruption is inputted from the memory control circuit 111f. The counter processing circuit 111b counts the value of the statistical information of the inputted data using the HW counter selected at that time.

Figure 3:
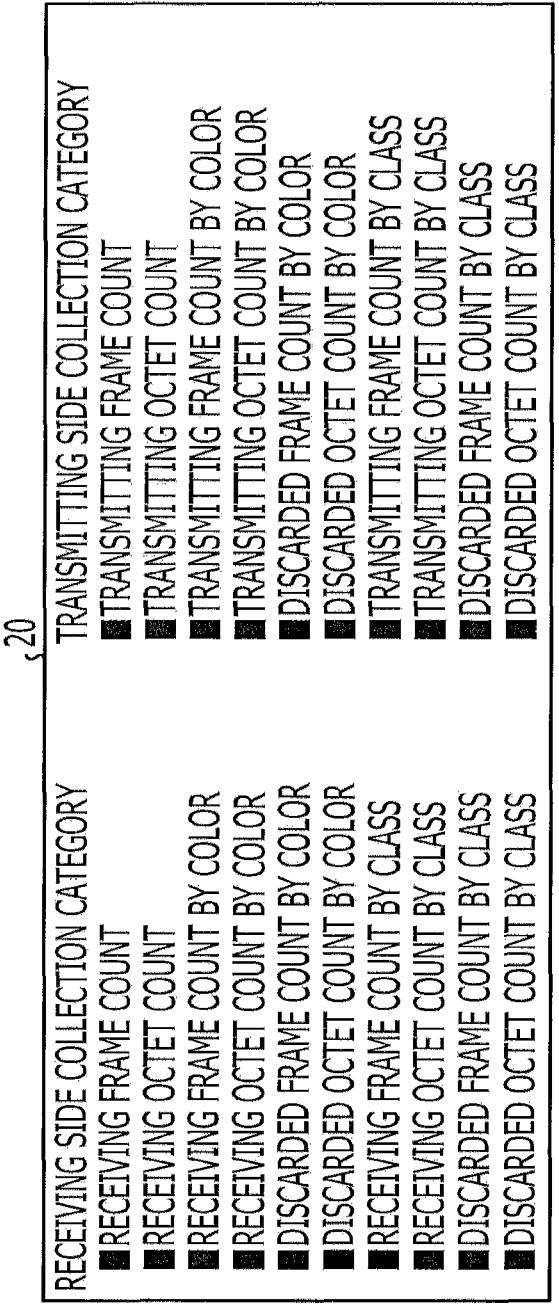
FIG. 3 illustrates an example of statistical information collected and managed in an optical transmitting device.

FIG. 3 illustrates an example of statistical information 20 collected and managed in an optical transmitting device 10. As illustrated in FIG. 3, the statistical information 20 is grouped into a receiving side collection category and a transmitting side collection category, and frame count and octet count are set according to the type in each of the collection categories. The frame count is grouped and managed as a receiving frame count, a receiving frame count by color, a discarded frame count by color, a receiving frame count by class, and a discarded frame count by class in the receiving side collection category. The transmission frame count is managed in a similar way in the transmitting side collection category. The octet count is grouped and managed as a receiving octet count, a receiving octet count by color, a discarded octet count by color, a receiving octet count by class, and a discarded octet count by class in the receiving side collection category. The transmission octet count is managed in a similar way in the transmitting side collection category. The color types may be, for example, three types such as green, yellow, and red. The class types may be, for example, eight types such as A, B, C, D, E, F, G, and H.

The memory control circuit 111f outputs a count value read request to the counter processing circuit 111b at certain polling periods (for example, 1-second intervals), and reads out the count value from the applicable HW counter 111d or 111e via the counter switch circuit 111c. The HW counters 111d and 111e include read-clear registers to clear the count value to "0" when the memory control circuit 111f reads out the value of the statistical information. The memory control circuit 111f reads out the applicable value of the statistical information A or B from the statistical information memory 111g and transmits the value of the statistical information A or B to the addition processing circuit 111j along with the count value.

The statistical information memory 111g internally includes a memory 111h and a memory 111i. The memory 111h stores the value of the statistical information A acquired from the HW counter 111d by the memory control circuit 111f. The memory 111i stores the value of the statistical information B acquired from the HW counter 111e by the memory control circuit 111f. The memories 111h and 111i may be implemented by a physically separate RAM, or may be configured as physically integrated as a data storing region divided into segments.

The addition processing circuit 111j adds the inputted value of the statistical information A or B to the count value, and outputs the addition result to the memory control circuit 111f. The memory control circuit 111f outputs the information to the statistical information memory 111g and causes the statistical information memory 111g to store the information when the addition result is received. The memory control circuit 111f manages the statistical information by repeating the abovementioned processing.

As described above, the optical transmitting device 10 according to the present embodiment allows for the provision of HW counters 111d and 111e inside the counter processing circuit 111b such that the HW counters that collect the statistical information can be switched at a bind period timing to conduct collection of the statistical information. The optical transmitting device 10 includes the two HW counters, HW counter 111d and HW counter 111e. At the point of time when a supplementary portion to replenish uncompleted statistical information is completely gathered by storing the statistical information from one bind period before the bind period currently being polled by the memory control circuit 111f, the optical transmitting device 10 gradually reads out the supplementary portion to replenish uncompleted statistical information to the memory 111h (or memory 111i) to be supplemented. As a result, the optical transmitting device 10 removes temporal disparities (variation) between the communication paths in the collected statistical information.

The optical transmitting device 10 according to the present embodiment causes a portion of the statistical information that is normally tallied in the bind period 0:00 to 0:15, to be stored by the HW counter 111d in the bind period 0:15 to 0:30. Due to the time lag accompanying the above storing, the statistical information memory 111g does not store real time statistical information at the same timing (roll over timing) as the end of the bind period. However, during actual operation, a device maintenance operator compares the above time lag after detecting a breakdown and analyzes the statistical information after a suitable amount of time has passed. Therefore, the variation in timing to collect the statistical information as described above is not a problem.

Figure 5:
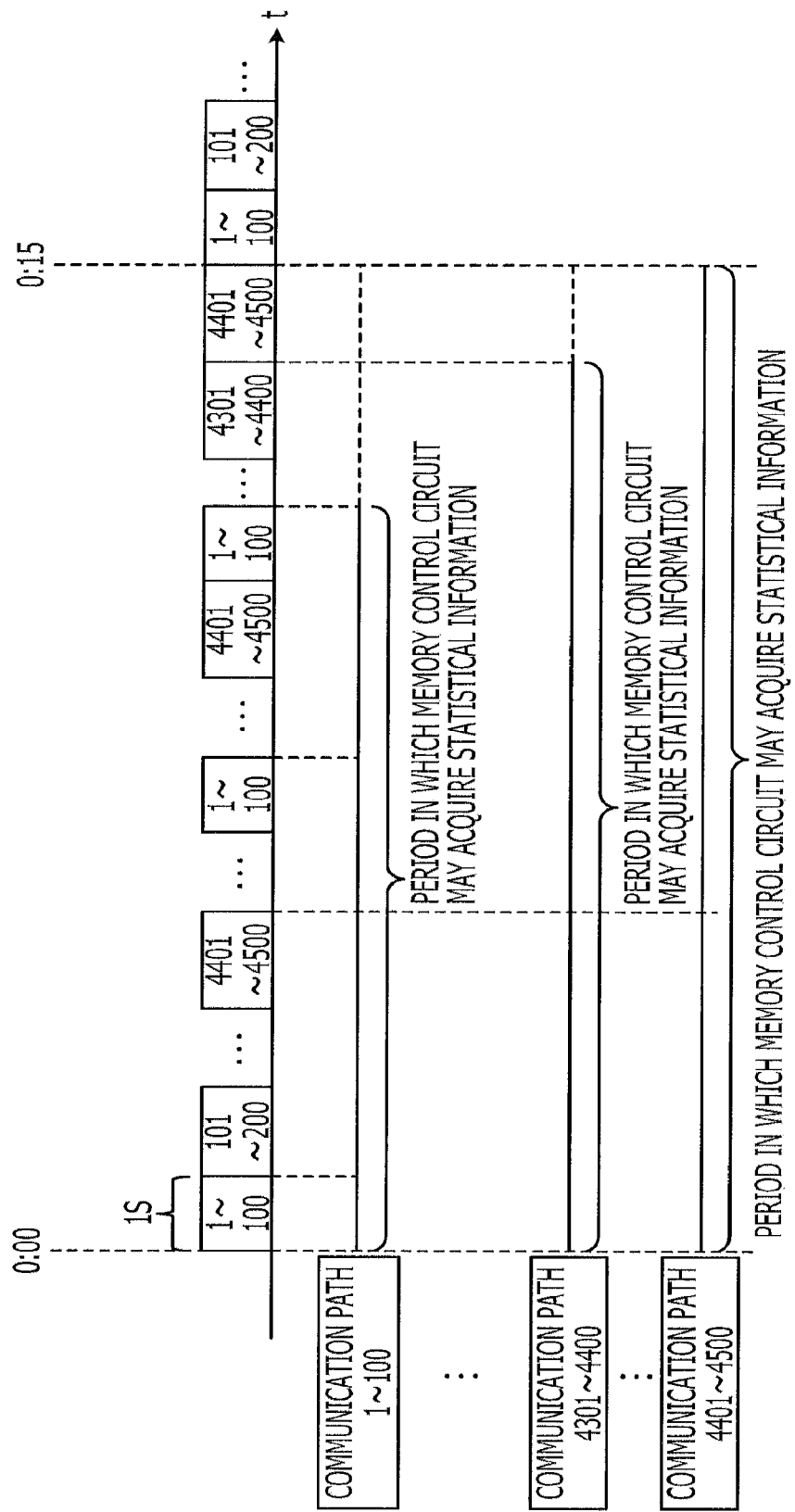
FIG. 5 illustrates periods in which statistical information can be acquired for each communication path by a memory control circuit with one HW counter.
Figure 6:
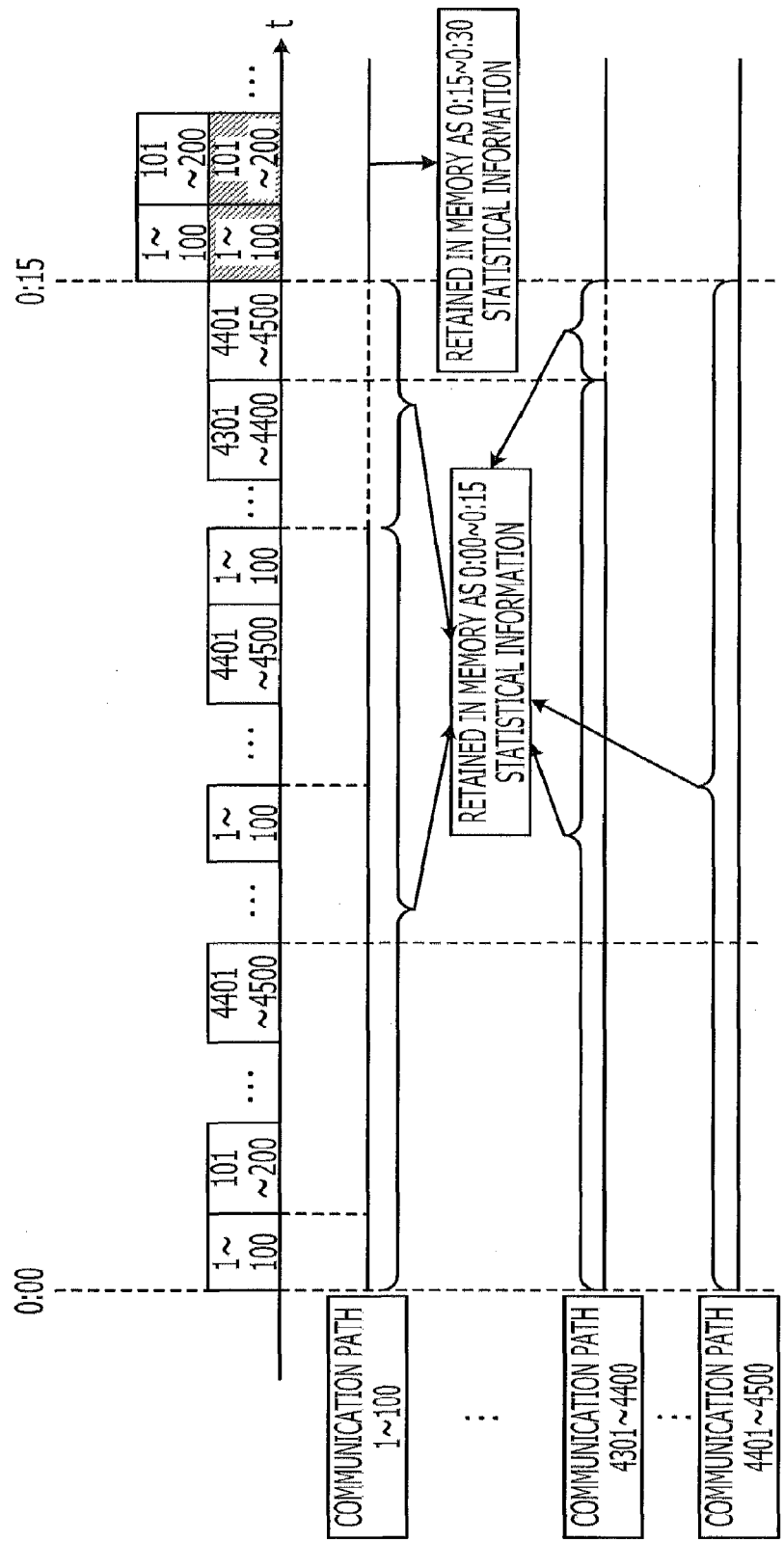
FIG. 6 illustrates periods in which statistical information can be acquired for each communication path by the memory control circuit with two HW counters.

A process in which the memory control circuit 111f of the optical transmitting device 10 according to the present embodiment acquires statistical information will be described hereinbelow with reference to FIGS. 4 to 6.

Figure 4:
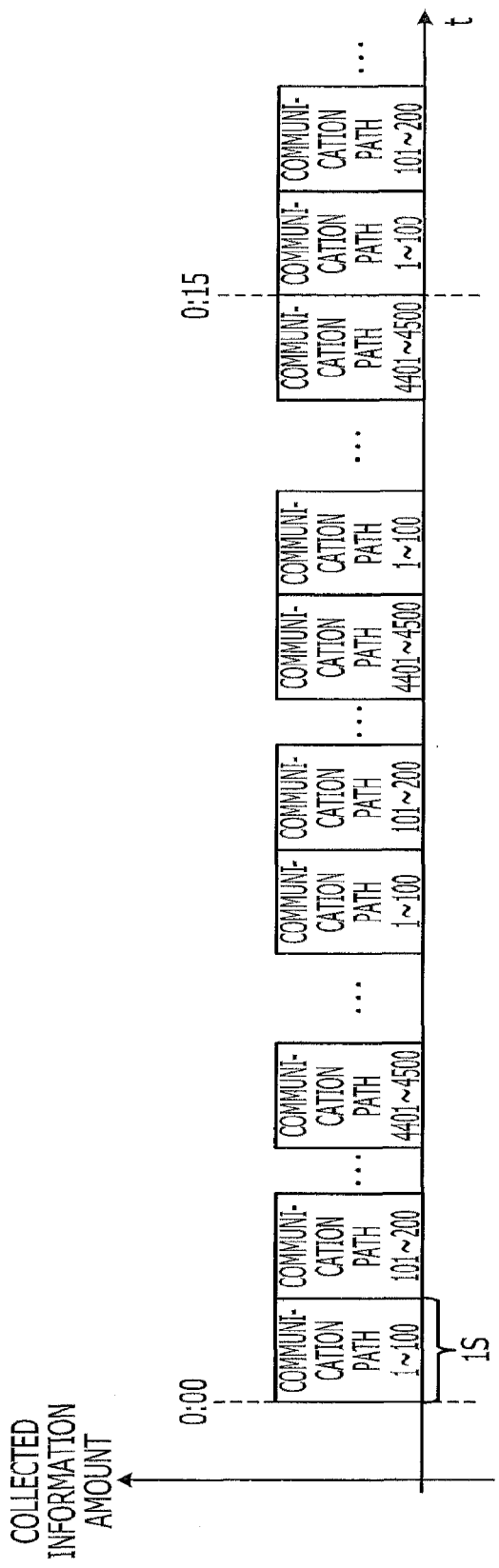
FIG. 4 is a schematic diagram for describing processing by a memory control circuit when reading 100 communication paths at a time.

FIG. 4 is a schematic diagram for describing processing by the memory control circuit 111f when reading 100 communication paths at one time. In FIG. 4, the X-axis represents time t and the Y-axis represents the amount of collected statistical information (collected information amount). As illustrated in FIG. 4, polling is conducted in 1-second units on 100 communication paths such that communication paths 1 to 100, communication paths 101 to 200, . . . communication paths 4401 to 4500, communication paths 1 to 100, communication paths 101 to 200, . . . are polled. Therefore, the statistical information of all the communication paths from communication path 1 to communication path 4500 are polled 20 times (900 s÷45 s) during a bind period of 15 minutes (900 seconds) from 0:00 to 0:15. The above processing by the memory control circuit 111f is then repeated in the same way during bind periods after 0:15. As described above, the information read out by the memory control circuit 111f in one polling over the bind periods is accumulated in the statistical information for 100 communication path portions. Therefore, the memory control circuit 111f is able to process all the statistical information acquired by the polling, and the load on a CPU including the memory control circuit 111f can be reduced to a level that does not affect other processing.

Although processing by the abovementioned memory control circuit 111f is able to effectively reduce loads, a new problem may be of concern in that variation occurs between the periods of statistical information that can be acquired by the memory control circuit 111f (CPU) due to the communication paths. FIG. 5 illustrates periods in which value of the statistical information can be acquired for each communication path by the memory control circuit 111f with one HW counter. In FIG. 5, the solid line represents a statistical information time period in which the memory control circuit 111f has finished reading out at the 0:15 timing. The dashed line represents a statistical information time period in which the memory control circuit 111f does not read out the statistical information of the corresponding communication paths up to 0:15. For example, the communication paths 1 to 100 to be read out after the last reading out during the first bind period (0:00 to 0:15) are not polled by the 0:15 timing. As a result, the statistical information of the end communication paths 101 to 4500 (dashed line portion) are not read out as statistical information of the bind period 0:00 to 0:15. The same can be said for the communication path 4301 to 4400. Specifically, although the statistical information up to the statistical information for the communication paths 4301 to 4400 (solid line portion) can be polled, the statistical information (dashed line portion) of the end communication paths 4401 to 4500 in the bind period 0:00 to 0:15 are not read out as statistical information in that bind period. As illustrated in FIG. 5, the time period for the statistical information that the memory control circuit 111f can acquire (the period represented by the solid line) at the 0:15 timing increases in the ascending order of the communication paths, and the time period for the statistical information that are not acquired (the period represented by the dashed line) decreases in the ascending order of the communication paths. As a result, time slots in which statistical information can be acquired by the memory control circuit 111f through polling are different for each communication path. The statistical information (dashed line portion) not read out at the 0:15 timing is then mistakenly tallied as statistical information of the next bind period 0:15 to 0:30. This is the cause of the variation in statistical information between communication paths or between bind periods.

Accordingly, the optical transmitting device according to the present embodiment is equipped with two HW counters. FIG. 6 illustrates periods in which statistical information can be acquired from communication paths by the memory control circuit 111f with two HW counters. A first HW counter A collects value of the statistical information (bracketed portions) from 0:00 to 0:15 that is the first bind period as illustrated in FIG. 6. The HW counter A is switched to the second HW counter B at the timing when the first bind period is finished (0:15). The second HW counter B starts to collect the value of the statistical information (hatched portions in FIG. 6) from 0:15 to 0:30 that is the next bind period.

Since the value of the statistical information collected by the HW counter A is temporarily stored in the HW counter A, the memory control circuit 111f reads out the collected value of the statistical information (history information) from the HW counter A during the next polling and causes the history information to be stored in the statistical information memory 111g as value of the statistical information of 0:00 to 0:15. As a result, the memory control circuit 111f is able to acquire the statistical information (dashed line portion) that could not be acquired at the 0:15 point of time. Accordingly, all the statistical information can be tallied for the bind period that is normally to be tallied without relying on the communication paths, and the management of statistical information may be conducted for an accurate time period and without variation between communication paths. Similarly, the memory control circuit 111f reads out the collected value of the statistical information (history information) from the HW counter B for the bind period 0:30 to 0:45 and causes this history information to be stored in the statistical information memory 111g as value of the statistical information of 0:15 to 0:30. Since switching between the HW counters A and B is conducted for each bind period at 15-minute intervals, the optical transmitting device 10 is able to separately acquire current information and history information while switching between the HW counters A and B. Therefore, the optical transmitting device 10 is able to accurately manage statistical information while reducing loads on the memory control circuit 111f (CPU) by causing current information and history information to be stored in the statistical information memory 111g (RAM) as value of the statistical information.

The value of the statistical information of the first bind period (0:00 to 0:15) is not collected until the value of the statistical information that is not acquired in the first bind period with the above method is stored in the statistical information memory 111g by the memory control circuit 111f. However, since the maintenance operator analyzes problem spots based on the statistical information a short time after a breakdown in the optical transmitting device is detected under actual operations, this type of delay leads to no particular problems.

Figure 7:
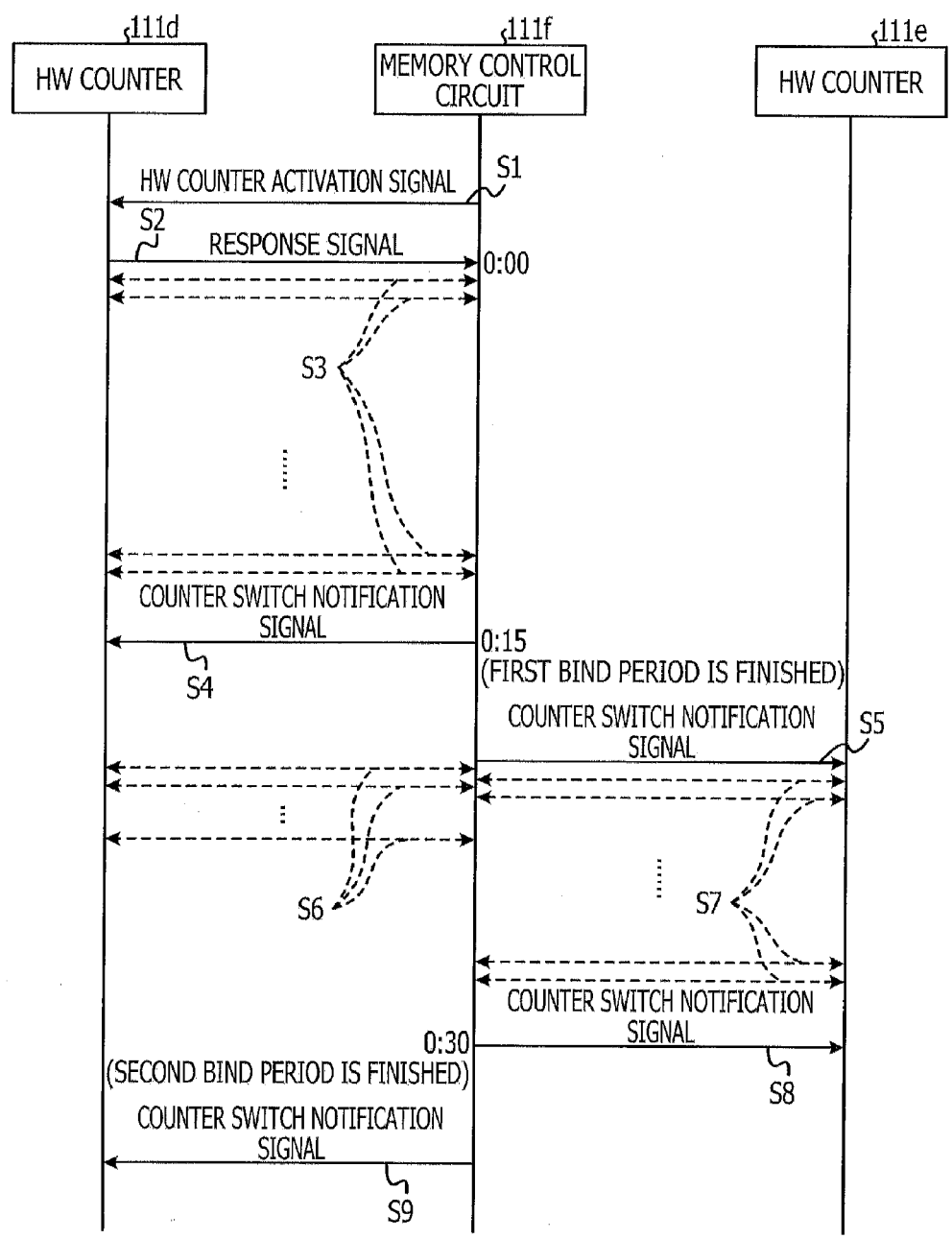
FIG. 7 describes operations by a memory control circuit to acquire divided statistical information while switching between HW counters.

FIG. 7 describes operations by the memory controls circuit 111f to acquire divided value of the statistical information while switching between HW counters 111d and 111e.

In S1, the memory control circuit 111f activates the HW counter 111d to start collecting value of the statistical information for measuring the value of the statistical information from 0:00 to 0:15. The HW counter 111d returns a response signal to the memory control circuit 111f upon starting to collect the value of the statistical information (S2).

In S3, the memory control circuit 111f starts polling at 1-second intervals, reads and clears a register of the HW counter 111d, and tallies the statistical information read out from the HW counter 111d in the memory 111i. The polling by the memory control circuit 111f is conducted continuously during a specific bind period (a 15-minute period in the present embodiment). In the present embodiment, since 100 communication paths are polled every second as one unit, polling is conducted 900 times (15 minutes×60 seconds) in one bind period.

When 15 minutes have elapsed from the start of polling and the first bind period is finished, the memory control circuit 111f notifies the HW counters 111d and 111e about the switching of the HW counters by outputting a switch notification signal (S4, S5). The HW counter 111d that receives the switch notification, stores the value of the statistical information measured by the HW counter 111d after the second bind period has begun until the next block of statistical information is read out. Conversely, the HW counter 111e starts measuring the value of the statistical information in the second bind period from 0:15 to 0:30 upon receiving the switch notification from the memory control circuit 111f.

In the second bind period, the memory control circuit 111f conducts polling of the communication path groups (100 communication paths) one at a time and tallies the statistical information read out from the HW counter 111d in the memory 111h as the first bind period statistical information (S6). In the second bind period, the memory control circuit 111f conducts polling on the HW counter 111e in 1 second intervals in the same way as in S3 (S7). The memory control circuit 111f reads out the value of the statistical information only from the HW counter 111e after the second polling of the communication paths and tallies the statistical information from 0:15 to 0:30. Specifically, in a 45-second period after the start of the second bind period, the memory control circuit 111f writes the value of the statistical information to both the memories 111h and 111i upon reading out the value of the statistical information from both the HW counters 111d and 111e. As a result, the value of the statistical information read out from the HW counter 111d is stored in the memory 111h as the value of the statistical information of 0:00 to 0:15. Additionally, the value of the statistical information read out from the HW counter 111e is stored in the memory 111i as the value of the statistical information of 0:15 to 0:30. The memory control circuit 111f sounds an alarm accordingly when a communication path that exceeds an alarm threshold is present during the polling.

Accompanying the finish of the second bind period, the memory control circuit 111f outputs HW counter switch notification signals to both the HW counters 111e and 111d in the same way as S4 and S5 (S8, S9). As a result, the HW counters are switched from HW counter 111e to HW counter 111d, and processing similar to the abovementioned S3 to S7 is repeatedly continued. In this way, the memory control circuit 111f removes variations in statistical information measurement times and in statistical information addresses by causing the statistical information to be stored in the memories 111h and 111i while switching the HW counters 111d and 111e that read out the value of the statistical information.

Figure 8:
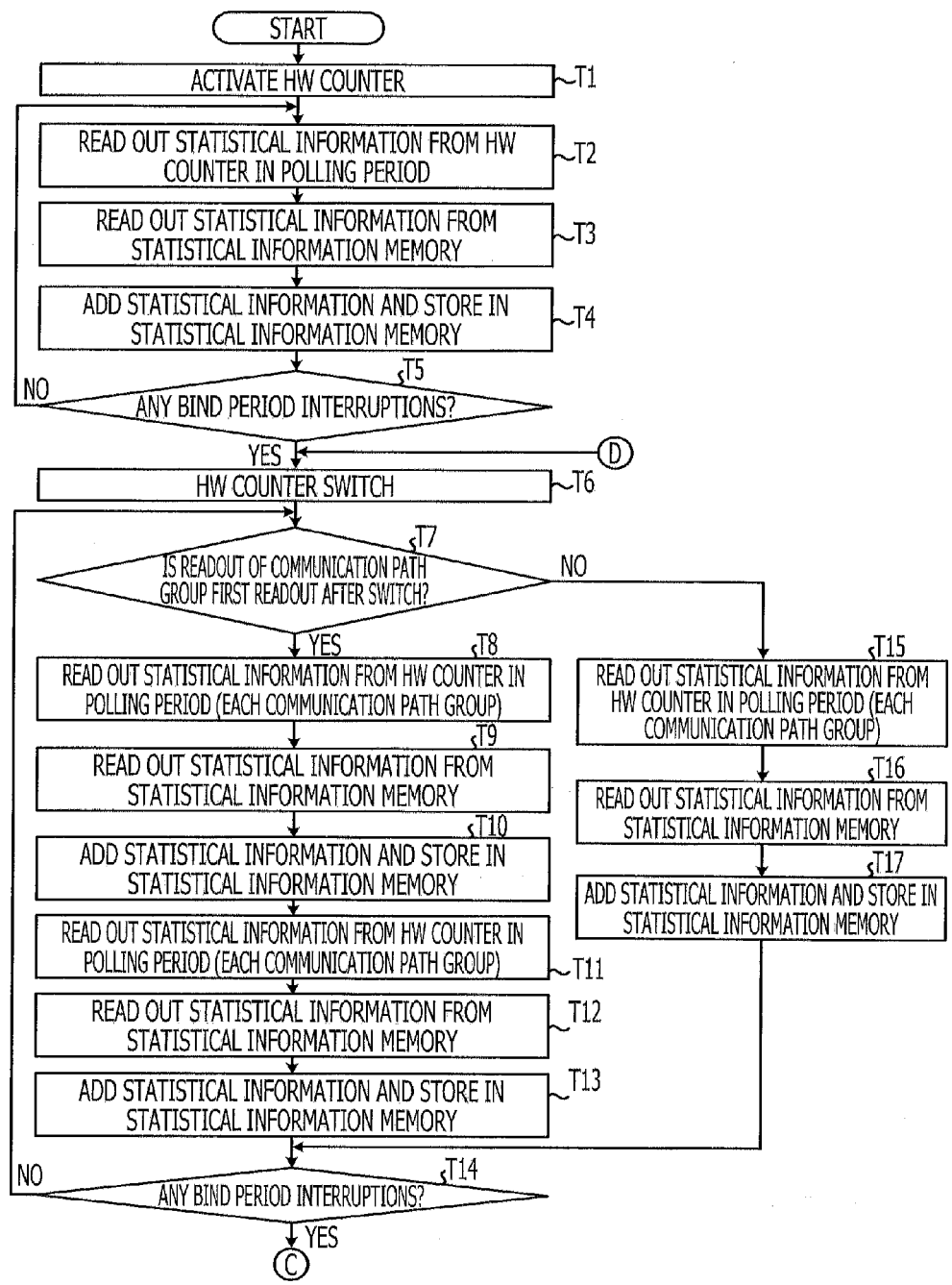
FIG. 8 is the first portion of a flow chart describing statistical information processing circuit operations.
Figure 9:
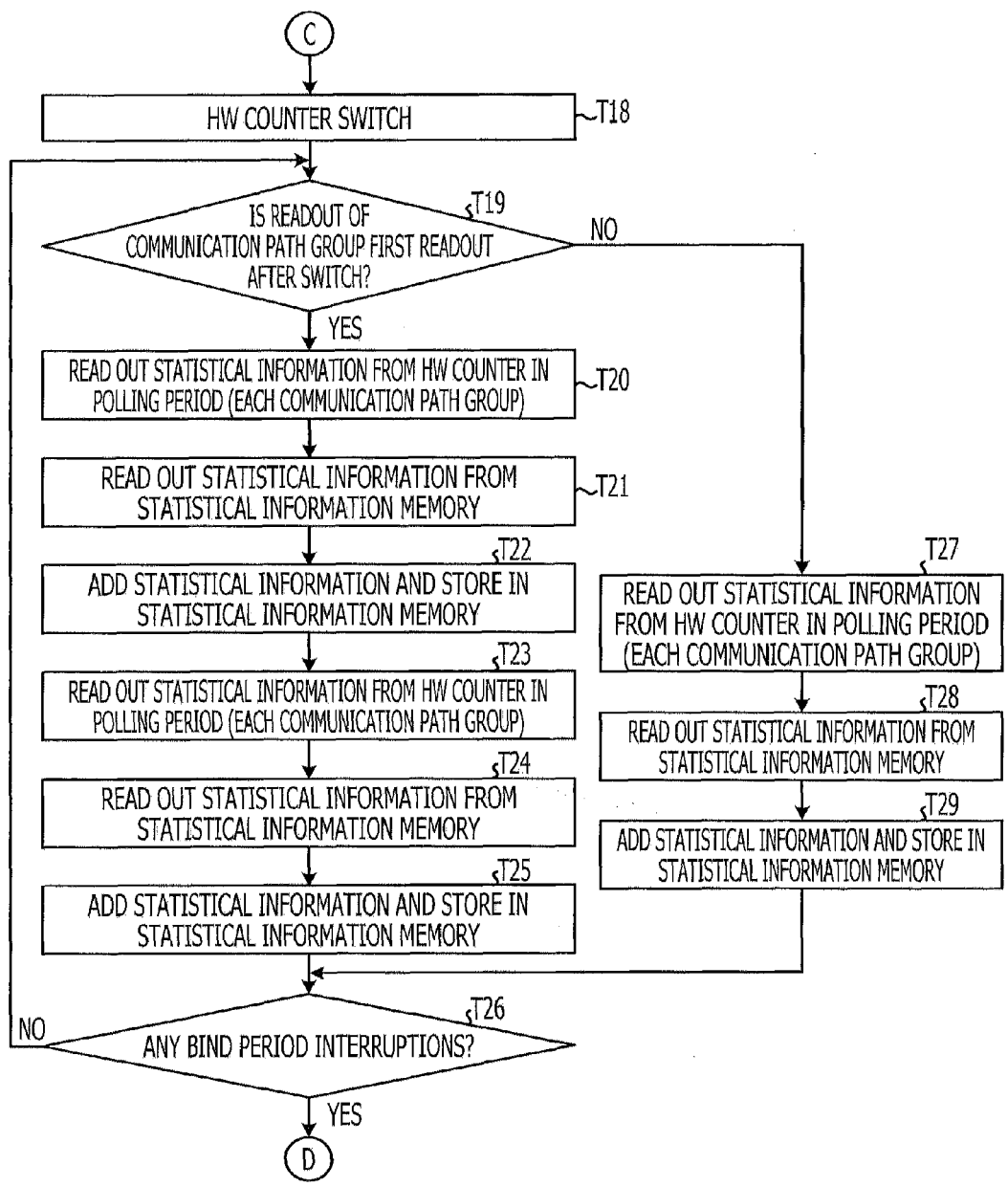
FIG. 9 is the second portion of the flow chart describing statistical information processing circuit operations.

Operations by the statistical information processing circuit 111 will be described next with reference to FIGS. 8 and 9. FIGS. 8 and 9 represent a flow chart describing operations of the statistical information processing circuit 111.

At T1, the HW counter 111d counts value of statistical information. Specifically, when the counter switch circuit 111c selects the HW counter 111d in an initial state, the counter switch circuit 111c measures the statistical information received from the frame analyzing unit 111a with the HW counter 111d.

At T2, the memory control circuit 111f reads out, from the HW counter 111d, the value of the statistical information of the communication path group subject to acquisition (for example, communication path 1 to communication path 100) in 1-second polling periods. Since the HW counter 111d is a read-clear counter, the HW counter 111d clears the HW counter 111d value to "0" accompanying the readout of the value of the statistical information.

At T3, the memory control circuit 111f reads out the value of the statistical information of the communication path group subject to measuring from the memory 111h of the statistical information memory 111g. The memory control circuit 111f outputs the statistical information read out in T2 and T3 to the addition processing circuit 111j.

At T4, the addition processing circuit 111j adds the inputted value of the statistical information, and outputs the addition result to the memory control circuit 111f. The memory control circuit 111f outputs the value of the statistical information addition result received from the addition processing circuit 111j to the statistical information memory 111g. Since the memory from which the value of the statistical information was read out in T3 is the memory 111h, the memory 111h stores the value of the statistical information addition result.

At T5, the memory control circuit 111f monitors the bind periods for the presence of interruptions. If the memory control circuit 111f detects an interruption (T5: Yes), the processing moves to T6. The processing from T2 to T4 is repeatedly conducted while no interruptions are detected (T5: No).

At T6, the memory control circuit 111f controls the counter switch circuit 111c to conduct switching from the HW counter 111d to the HW counter 111e. The HW counter 111d is stopped after switching the HW counters, but the count value at that time is stored.

At T7, the memory control circuit 111f determines whether or not the readout of the communication path group subject to polling is the first readout after the rollover, that is, after the HW counter switch. If the readout of the communication path group is determined as the first readout based upon the result of the determining (T7: Yes), the processing moves to T8. If the readout of the communication path group is determined as a second or subsequent readout (after the second readout) (T7: No), the processing moves to T15 (see FIG. 9). Specifically, the memory control circuit 111f continues to read out the value of the statistical information of the communication path groups in 1-second polling periods from both of the HW counters 111d and 111e until the value of the statistical information has been read out from all of the communication path groups once.

At T8, the memory control circuit 111f reads out, from the HW counter 111d, the statistical information (count value) of the communication path group subject to acquisition in 1-second polling periods for each of the communication path groups. Processing similar to the abovementioned T3 and T4 is conducted at T9 and T10 on the value of the statistical information temporarily stored in the HW counter 111d without being tallied during the first bind period. As a result, an insufficient portion of the statistical information that has not been tallied during the first bind period is added to the memory 111h such that all the value of the statistical information belonging to the first bind period is accurately reflected in the memory.

The adding processing of the value of the statistical information in T8 to T10 is conducted in the same way with the HW counter 111e. Specifically, at T11, the memory control circuit 111f reads out, from the HW counter 111e, the value of the statistical information of the communication path groups subject to acquisition in 1-second polling periods. At T12, the memory control circuit 111f reads out the value of the statistical information of the communication path group subject to measuring from the memory 111i of the statistical information memory 111g, and outputs the read out statistical information to the addition processing circuit 111j. At T13, the addition processing circuit 111j adds the received value of the statistical information and outputs the result of the adding to the memory control circuit 111f. The memory control circuit 111f outputs the value of the statistical information addition result received from the addition processing circuit 111j to the statistical information memory 111g. Since the memory from which the value of the statistical information was read out in T12 is the memory 111i, the memory 111i stores the statistical information addition result.

At T14, the memory control circuit 111f again monitors the bind periods for the presence of interruptions. If the memory control circuit 111f detects an interruption (T14: Yes), the processing moves to T18 in FIG. 9. The processing from T7 to T14 is repeatedly conducted while no interruptions are detected (T14: No).

When the result of the determining in T7 indicates that the readout of the communication path groups is the second or subsequent readout (T7: No), the statistical information processing circuit 111 conducts the readout from the HW counter 111e without reading out from the HW counter 111d, and then conducts the adding and the storing processing only. The processing conducted from T15 to T17 is similar to the abovementioned processing conducted in T11 to T13 respectively, and a detailed explanation will be omitted.

At T18 in FIG. 9, the memory control circuit 111f controls the counter switch circuit 111c to conduct switching from the HW counter 111e to the HW counter 111d. The HW counter 111e is stopped after switching the HW counters, but the count value at that time is stored.

As illustrated in FIG. 9, the processing from T19 to T29 is similar to the abovementioned processing from T7 to T17 respectively, except that the HW counters 111d and 111e are reversed. Therefore, a detailed explanation will be omitted. Specifically, the processing from steps T19 to T26 in FIG. 9 correspond to steps T7 to T14 respectively in FIG. 8, and the processing from steps T27 to T29 correspond to steps T15 to T17 respectively. The processing from T19 to T26 is repeatedly continued while the memory control circuit 111f does not detect interruptions in T26 (T26: No). If the memory control circuit 111f detects an interruption (T26: Yes), the processing returns to T6 in FIG. 8 to conduct the processing from T6.

As described above, the optical transmitting device 10 includes the HW counters 111d and 111e, the memories 111h and 111i, the memory control circuit 111f, and the counter switch circuit 111c. The HW counter 111d acquires the value of the statistical information A (first statistical information) divided in the time-direction from the first bind period (0:00 to 0:15). The HW counter 111e acquires the value of the statistical information B (second statistical information) divided in the time-direction from the second bind period (0:15 to 0:30). The memory 111h stores the value of the statistical information A. The memory 111i stores the value of the statistical information B. The memory control circuit 111f acquires and divides the value of the statistical information A and B in specific time units (for example, 1-second periods), and causes the memory 111h to store the value of the statistical information A, and causes the memory 111i to store the value of the statistical information B. The counter switch circuit 111c switches the value of the statistical information acquired by the memory control circuit 111f from value of the statistical information A to value of the statistical information B at the start of the second bind period (0:15 to 0:30). In particular, the memory control circuit 111f acquires the value of the statistical information B and at least a portion of the value of the statistical information A in a specific time period (for example, 45 seconds) from the start of the second bind period (0:15), and causes the memory 111h to store the at least a portion of the value of the statistical information A. The value of the statistical information A and B includes a count value of errors that occur in the communication paths of the optical transmitting device 10.

Specifically, the statistical information from 0:00 to 0:15 of the first bind period (roll over) is counted by the HW counter 111d in the optical transmitting device 10 according to the present embodiment. Next, the optical transmitting device 10 switches the HW counters from the HW counter 111d to the HW counter 111e at the bind period (roll over) timing to start counting the statistical information from 0:15 to 0:30. Since the value of the statistical information collected by the HW counter 111d is stored in the HW counter 111d, the statistical information processing circuit 111 of the optical transmitting device 10 reads out the HW counter 111d value of the statistical information at the timing of the next polling. In other words, the statistical information processing circuit 111 reads out the value of the statistical information from the HW counter 111d after 15 minutes has elapsed up to the first communication path 4500. The statistical information processing circuit 111 then causes the 0:00 to 0:15 statistical information memory 111h to store the read out value of the statistical information. At the same time, since the HW counter 111e is also counting the 0:15 to 0:30 statistical information, the statistical information processing circuit 111 reads out the 0:15 to 0:30 statistical information at the same polling timing as the HW counter 111d and adds the 0:15 to 0:30 statistical information to the 0:15 to 0:30 statistical information memory 111i. As a result, the memory 111h is able to store the value of the statistical information that could not be stored up to 0:15 from the polling that is conducted from 0:15 onward. Therefore, the optical transmitting device 10 is able to accurately manage statistical information without variation in the time periods in which the statistical information is acquired from the communication paths. More specifically, the memory control circuit 111f (CPU) is able to process the statistical information of all the applicable communication paths based on one polling. Moreover, an increase in CPU loads that affect other processing is reduced. Additionally, an increase in power consumption of the entire device is suppressed.

Although the load on the memory control circuit 111f (CPU) that conducts the polling can be reduced in the optical transmitting device 10 according to the present embodiment, a new problem may occur in that the CPU load may be increased by the amount of another HW counter since the optical transmitting device 10 includes two HW counters instead of the conventional one HW counter. Specifically, the statistical information processing circuit 111 conducts polling concurrently with both the HW counter 111d and 111e to collect value of the statistical information, albeit temporarily, at the bind period (roll over) timing. In other words, the memory control circuit 111f reads out twice the amount of statistical information from other points of time until the polling up to the communication path 4500 is finished immediately after switching the HW counters.

Figure 10:
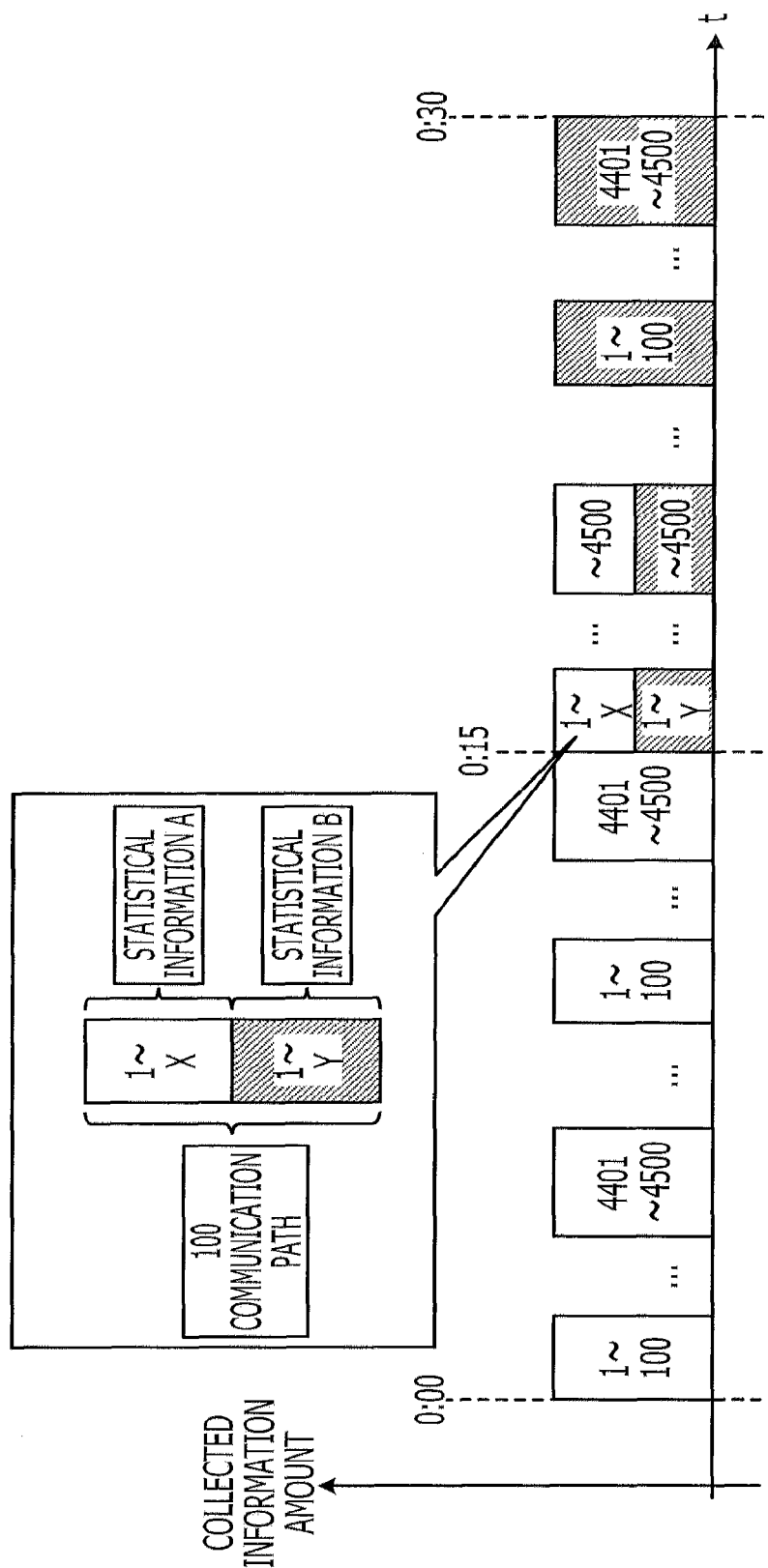
FIG. 10 is a schematic diagram for describing processing by a memory control circuit when an upper limit of statistical information acquired by one polling is set at 100 communication path portions.

The memory control circuit 111f of the optical transmitting device 10 according to the present embodiment acquires the value of the statistical information B along with at least a portion of the value of the statistical information A during a specific period of time (for example, 45 seconds) from the start of the second period (0:15). The memory control circuit 111f acquires the value of the statistical information A and the value of the statistical information B such that an amount of information combining the value of the statistical information A and B acquired during a specific period of time unit (for example, 1 second) is equal to or less than a specific value (amount of statistical information of 100 communication paths). Specifically, the optical transmitting device 10 reduces the CPU load by lowering the amount of statistical information to be polled only in a time period slot in which the collection of the statistical information overlaps. FIG. 10 is a schematic diagram for describing processing by the memory control circuit 111f when an upper limit of statistical information acquired by one polling is set at 100 communication path portions. The X-axis in FIG. 10 represents time, and the Y-axis represents the amount of statistical information collected. Moreover, in FIG. 10, the amount of collected information is suppressed such that the value of the statistical information A and the value of the statistical information B are combined to make up 100 communication path portions until the HW counter 111d statistical information (communication paths 1 to 4500) has been polled after the first bind period 0:00 to 0:15 is finished. Here, the value of the statistical information A is value of the statistical information of the bind period 0:00 to 0:15 acquired from the HW counter 111d and stored in the memory 111h. Further, the value of the statistical information B (shaded portions in FIG. 10) is value of the statistical information of the bind period 0:15 to 0:30 acquired from the HW counter 111e and stored in the memory 111i.

For example, as illustrated in FIG. 10, a user is able to specify, as X and Y, a ratio between the value of the statistical information A and the value of the statistical information B acquired in concurrent polling if an upper limit of value of the statistical information that can be acquired is 100 communication paths. However, values of the number of statistical information A communication paths X and the number of statistical information B (shaded portions in FIG. 10) communication paths Y desirably satisfy the following two conditional expressions.

$$\text{The number of communication paths acquired in one polling} = X + Y \quad (1)$$

$$\text{The number of all communication paths} \leq \text{the frequency of polling per 1 bind period} \times X \quad (2);$$

where X and Y are natural numbers and the total number of communication paths is the number of communication paths registered in the IF 11 and IF 13 illustrated in FIG. 1.

For example, as described in the present embodiment, when the number of communication paths acquired in one polling is 100 communication paths, the total number of communication paths is 4500, and the frequency of polling per one bind period is 900 times (15 minutes×60 seconds), X is desirably a whole number of 5 or more. Furthermore, Y is a whole number derived from 100−X.

The user may freely set the X and Y values within the range of the above conditional expressions. For example, the user may set the X and Y values according to a priority of the statistical information A or B. Specifically, if the user wants to enable the optical transmitting device 10 to quickly ascertain the statistical information A, that is, the history information, the user may increase the X value corresponding to the statistical information A. Conversely, if the user wants to enable the optical transmitting device 10 to quickly acquire the statistical information B, that is, the current information, the user may increase the communication path number Y value corresponding to the statistical information B. In this way, the user is able to tally the statistical information corresponding to a priority by appropriately modifying the X and Y values.

Figure 11:
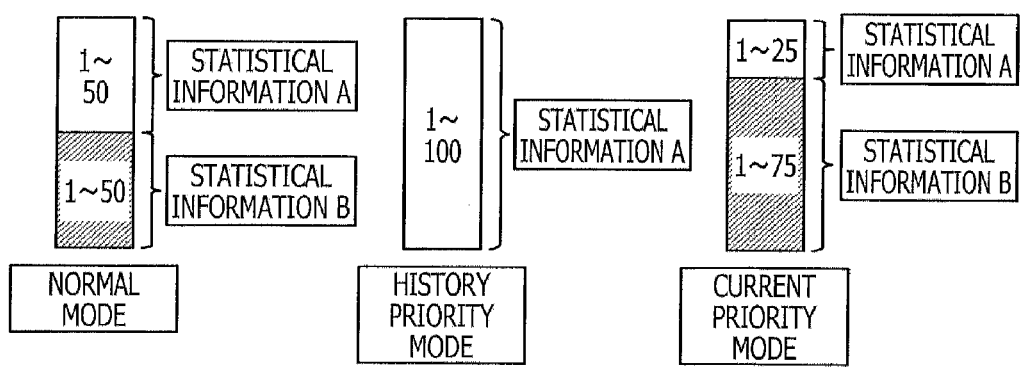
FIG. 11 illustrates a ratio of statistical information A and B according to a setting mode.

Additionally, the optical transmitting device 10 may be previously prepared with multiple modes corresponding to a ratio of the acquired value of the statistical information A and B so that the user is able to select a mode by conducting a specific command. FIG. 11 illustrates a ratio of value of the statistical information A and B according to a setting mode. For example, as illustrated in FIG. 11, the optical transmitting device 10 is prepared with three modes, a normal mode, a history priority mode, and a current priority mode, such that the user may select any of the modes from a command line.

The X values in each of the modes are illustrated as 50, 100, and 25 respectively. However, these values may be modified accordingly by the user.

When the normal mode is selected, the ratio between the value of the statistical information A and B (shaded portions in FIG. 11) is set at 1:1. Therefore, this mode may be selected when there is no particular priority for the statistical information. The statistical information A is ascertained first when the history priority mode is selected. Therefore, this mode may be selected when the user desires to prioritize the history information. In the history priority mode, the statistical information B is not acquired until the acquisition of the statistical information A is finished, and then the acquisition of the statistical information B indicated by the shading in FIG. 11 is started as normal after all the statistical information A is acquired. When the current priority mode is selected, ascertaining the statistical information A takes more time since the proportion of the statistical information A that is the history information is smaller at 25 communication paths. Therefore, this mode may be selected when the user desires to prioritize the current information.

As described above, by previously preparing multiple modes corresponding to ratios between the value of the statistical information A and B in the optical transmitting device 10, the user can easily and quickly acquire value of the statistical information and thus be able to detect the causes of breakdowns by prioritizing the statistical information to be tallied through the simple operation of selecting a mode.

Figure 12:
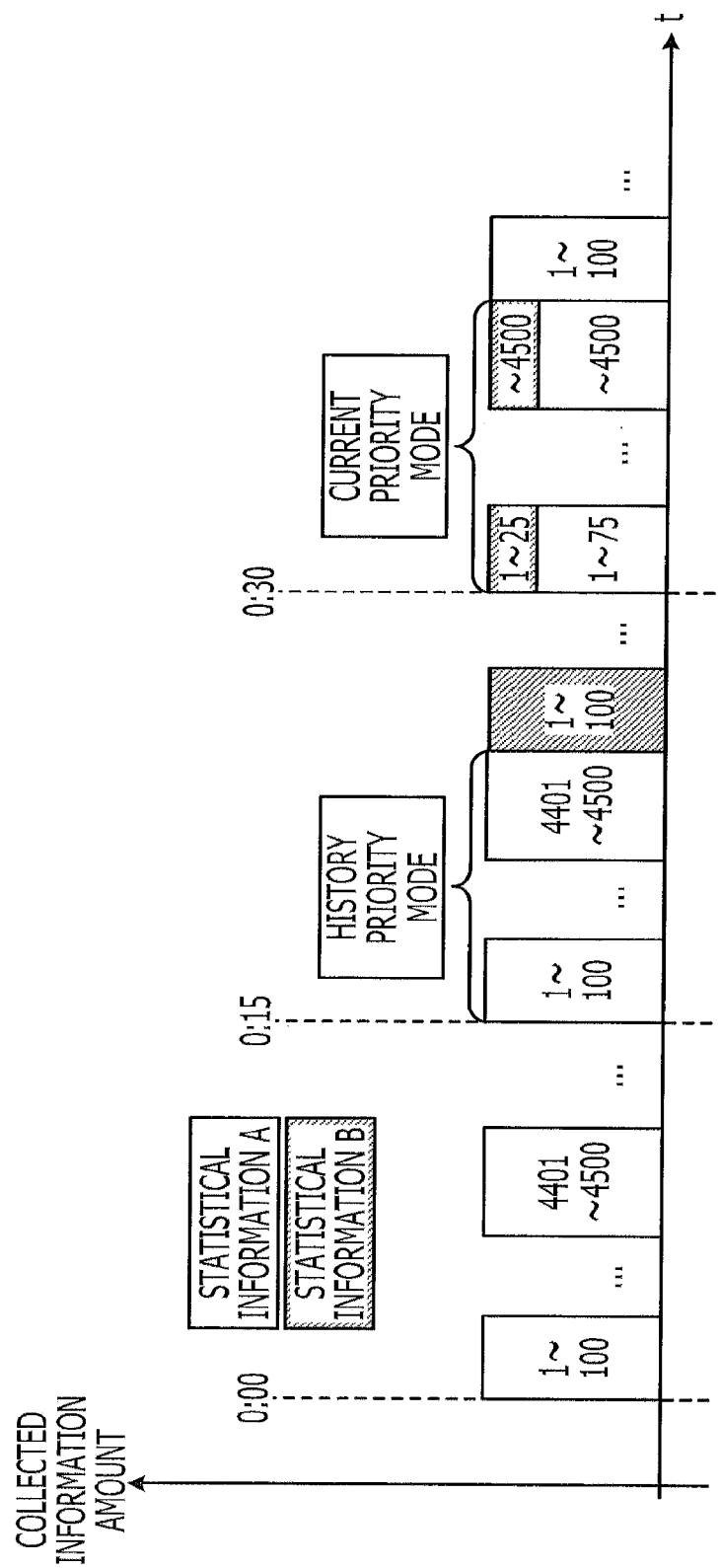
FIG. 12 illustrates a condition in which a mode is automatically switched for each bind period.

Furthermore, the mode switching may be conducted automatically without user settings. FIG. 12 illustrates a condition in which a mode is automatically switched for each bind period. As illustrated in FIG. 12, only value of the statistical information A is acquired in the bind period 0:00 to 0:15, and the memory control circuit 111f reads out a count value of the statistical information A (history information) from the memory 111h at the timing (0:15) of the HW counter switch. If the count value does not exceed a previously set threshold, the optical transmitting device 10 may move to the history priority mode by being able to determine that the amount of alarms is small. As a result, the optical transmitting device 10 quickly supplements a shortage of the past statistical information to have accurate statistical information. After a further 15 minutes, the memory control circuit 111f reads out a count value of the statistical information B (which is history information at this point) indicated by shading in FIG. 11 from the memory 111i at the HW counter switch timing (0:30). If the count value exceeds a previously set threshold, the optical transmitting device 10 may move to the current priority mode to cause the storing of more statistical information by being able to determine that there is a large amount of alarms. As a result, the optical transmitting device 10 preferentially collects the latest statistical information conforming to the current conditions. In this way, the optical transmitting device 10 is able to appropriately change the storage location of the statistical information according to the amount of alarms from the optical transmitting device 10 by repeatedly switching the mode according to the count value of the statistical information in the RAM. Therefore, the optical transmitting device 10 is able to cause the value of the statistical information to be effectively stored in the RAM according to a state of the amount of errors in the device. As a result, the statistical information memory 111g is able to be utilized effectively.

Although an optical transmitting device in the present embodiment is equipped with two HW counters, the HW counter 111d and the HW counter 111e, the tallying of the statistical information may be conducted by providing three or more HW counters and switching the HW counters in order for each bind period. Moreover, the timing of switching the HW counters in 15-minute intervals is not limited to the assumption in the present embodiment that the monitoring of alarms takes place in 15-minute periods, and thus the timing may be set to any timing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmitting device to manage statistic information indicating traffic of a plurality of communication paths, the transmission device comprising:
    a first counter circuit configured to count a value of first statistical information of the statistic information for every communication path of the plurality of communication paths at a first period of a predetermined term;
    a second counter circuit configured to count a value of second statistical information of the statistic information for every communication path of the plurality of communication paths at a second period following the first period;
    a first memory configured to store the value of the first statistical information;
    a second memory configured to store the value of the second statistical information; and
    a processor coupled to the first memory and the second memory and configured to:
        store, at the first period, a first value which is at least a portion of the first statistic information read out from the first counter circuit in the first memory,
        read out a second value of the first statistic information from the first counter circuit at the second period, the second value being a value unable to be read out from the first counter circuit during the first period, and store the second value in the first memory at the second period, and
        store, at the second period, at least a portion of the second statistic information read out from the second counter circuit in the second memory.

2. The transmitting device according to claim 1, wherein the processor is configured to acquire the second value of the first statistical information and at least a portion of the second statistical information for a specific time period from a start of the second period.

3. The transmitting device according to claim 2, wherein the processor is configured to acquire, when the second value of the first statistical information and the at least a portion of the value of the second statistical information are acquired in the specific time period from the start of the second period, the second value of the first statistical information and at least a portion of the second statistical information acquired in the specific time unit such that an amount of information combined from the second value of the first statistical information and the at least one portion of the second statistical information is not more than a specific value.

4. The transmitting device according to claim 3,
wherein the processor is configured to decide an amount of information of the first statistical information and an amount of information of the second statistical information by selecting any of multiple modes each having a different ratio of the amount of information of the first statistical information and the amount of information of the second statistical information.

5. The transmitting device according to claim 4,
wherein the multiple modes are previously prepared so as to select a mode by conducting a command.

6. The transmitting device according to claim 1,
wherein the first statistical information and the second statistical information include a count value of errors that occur in each communication path of the transmitting device.

7. An information acquisition control method by a transmission device which manages statistic information indicating traffic of a plurality of communication paths, the information acquisition control method comprising:
    counting, by a first counter circuit, a value of first statistic information of the statistic information for every communication path of the plurality of communication paths at a first period of a predetermined term;
    storing, by the processor, a first value which is at least a part of the first statistic information read out from the first counter circuit in the first memory at the first period;
    reading out, by the processor, a second value of the first statistic information from the first counter circuit at a second period following the first period, the second value being a value that unable to be read out from the first counter circuit during the first period, and storing the second value in the first memory at the second period;
    counting, by a second counter circuit, a value of second statistic information of the statistic information for every communication path of the plurality of communication paths at the second period; and
    storing, by the processor, at least a part of the second statistic information read out from the second counter circuit in the second memory at the second period.

8. The information acquisition control method according to claim 7, wherein the storing of the second value of the first statistic information and at least the part of the second information includes:
    acquiring the second value of the first statistical information and at least a portion of the second statistical information for a specific time period from a start of the second period.

9. The information acquisition control method according to claim 8, wherein the storing of the second value of the first statistic information and at least the part of the second information includes:
    acquiring, when the second value of the first statistical information and the at least a portion of the second statistical information are acquired in the specific time period from the start of the second period, the second value of the first statistical information and at least a portion of the second statistical information such that an amount of information combined from the second value of the first statistical information and the at least a portion of the second statistical information is not more than a specific value.

10. The information acquisition control method according to claim 9, further comprising:
    deciding, by the processor, an amount of information of the first statistical information to be acquired and an amount of information of the second statistical information to be acquired, by selecting any of multiple modes each having a different ratio of the amount of information of the first statistical information and the amount of information of the second statistical information, when the second value of the first statistical information and the at least a portion of the second statistical information are acquired in the specific time period from the start of the second period.

11. The information acquisition control method according to claim 10, wherein the selecting includes selecting any of multiple modes that are previously prepared so as to select a mode by conducting a command.

12. The information acquisition control method according to claim 7, wherein the counting of the first statistical information and the value of the second statistical information include counting the value of the first statistical information and the value of the second statistical information that include a count value of errors that occur in a communication path of the transmitting device.

13. A transmitting device comprising:
    a first counter circuit that counts a value of first statistical information divided in a time-direction from a first period;
    a second counter circuit that counts a value of second statistical information divided in a time-direction from a second period following the first period;
    a first memory that stores the value of the first statistical information;
    a second memory that stores the value of the second statistical information;
    a control circuit that acquires the value of the first statistical information and the value of the second statistical information and divides the acquired first statistical information and the acquired second statistical information by a specific time period unit and, and causes the first memory to store the value of the first statistical information, and causes the second memory to store the value of the second statistical information; and
    a switching circuit that switches the value of the statistical information acquired by the control circuit from the value of the first statistical information to the value of the second statistical information upon a start of the second period,
    wherein the control circuit acquires the value of the second statistical information and at least a portion of the value of the first statistical information for a specific time period from the start of the second period, and causes the first memory to store the at least a portion of the value of the first statistical information,
    wherein when the value of the second statistical information and the at least a portion of the value of the first statistical information are acquired in the specific time period from the start of the second period, the control circuit acquires the value of the first statistical information and the value of the second statistical information acquired in the specific time unit such that an amount of information combined from the value of the first statistical information and the value of the second statistical information is not more than a specific value, and
    wherein the control circuit decides an amount of information of the first statistical information and an amount of information of the second statistical information by selecting any of multiple modes each having a different ratio of the amount of information of the first statistical information and the amount of information of the second statistical information.

14. The transmitting device according to claim 13 wherein, the multiple modes are previously prepared so as to select a mode by conducting a command.

* * * * *